United States Patent Office 2,928,833
Patented Mar. 15, 1960

2,928,833

THEOPHYLLINE DERIVATIVES

Norman H. Leake and Marvel L. Fielden, Bristol, Tenn., assignors to The S. E. Massengill Company, Bristol, Tenn., a corporation of Tennessee No Drawing. Application March 3, 1959
Serial No. 796,774

20 Claims. (Cl. 260—253)

This invention relates to new compounds which are derivatives of theophylline or 1,3-dimethyl xanthine.

This application is a continuation-in-part of Leake and Fielden applications Serial Numbers 618,711 and 618,672, both filed October 29, 1956, both now abandoned.

The object of this invention is to provide novel 7- and 8-substituted theophylline derivatives.

Another object is to provide new 7-substituted 8-dialkylaminoalkylamino theophylline derivatives, which are characterized by marked therapeutic activity.

Still another object is to provide novel 7-substituted 8-halotheophylline derivatives, which can be employed in the preparation of more complex theophylline derivatives, such as said 7-substituted 8-dialkylaminoalkyl theophylline derivatives.

Other objects and advantages of our invention will become obvious from the following detailed description.

The new compounds of our invention are characterized by the following structural formulae:

I.

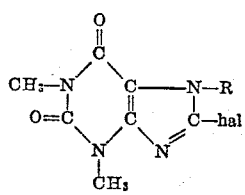

and

II.

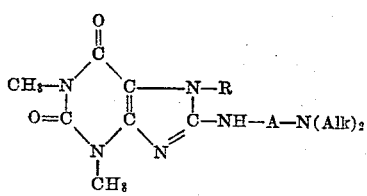

wherein hal is halogen, such as chlorine, bromine and iodine; R is lower-alkenyl, lower-alkinyl, epoxy-(lower-alkyl), aryl-(lower-alkyl), haloaryl-(lower-alkyl), (lower-alkyl)-aryl-(lower-alkyl), nitroaryl-(lower-alkyl), cycloalkyl, benzoyl-(lower-alkyl), cycloalkyl-(lower-alkyl), aryloxy-(lower-alkyl), and nitrobenzoyl-(lower-alkyl); A is lower alkylene; and Alk is lower alkyl. The lower alkenyl, alkinyl, alkyl and alkylene groups, which comprise up to 6 carbon atoms, can be straight or branched chain and will be so construed in this application and claims.

Our invention also includes the acid salts and the quaternary ammonium derivatives of the aforedescribed dialkylaminoalkylamino compounds.

The 8-halotheophylline derivatives of group I can be prepared by reacting an 8-halo-theophylline with the halide of the compound which is to be introduced as the 7-substituent in the presence of an alkali such as NaOH or KOH. The compounds are white crystalline solids which are insoluble in water, dilute acid and dilute alkali and soluble in hot organic solvents such as glacial acetic acid and isopropanol.

We can prepare the free base compounds of group II by reacting an 8-halotheophylline of group I having the desired 7-substituent with the appropriate di(lower-alkyl)-amino-(lower-alkyl)-amine. The free base 8-dialkylaminoalkylamino compounds are generally water-insoluble and vary from oils to crystalline solids at ordinary temperatures. They form salts, both with inorganic acids, such as HCl, HBr, $H_2SO_4$ and $HNO_3$, and with organic acids, such as acetic, propionic, maleic, fumaric, tartaric, citric, benzoic and salicyclic acid, which generally are crystalline solids of higher melting point than the parent free base and of increased water solubility. The physical characteristics of many of the acid salts in terms of their higher melting points and superior water solubility make them highly advantageous for use in many instances where these characteristics are desirable. The acid salts can be prepared by addition of the acid to a solution of the free base parent compound.

The quaternary ammonium derivatives of the 8-dialkylaminoalkylamino compounds can be made by treating a solution of the free base parent compound with an organic sulfate, nitrate or halide such as the chloride, bromide or iodide, and the like. The quaternary ammonium derivatives are generally advantageous because of their higher melting, crystalline solid properties and their substantial water solubility.

EXAMPLE I 8-chloro-theophylline and 2-methylallyl chloride in 0.2 molar quantities were refluxed with 1 N NaOH solution for 5 hours. The precipitated product was filtered, washed with dilute alkali, then with water and recrystallized from isopropanol. The product, 7-(2-methylallyl)-8-chloro-theophylline, melted at 110–13° C.

EXAMPLE II 7-propargyl-8-chloro-theophylline was prepared substantially as described in Example I, employing 0.1 molar quantities of 8-chloro-theophylline and propargyl bromide and refluxing for 2 hours. The compound melted at 166–8° C.

EXAMPLE III

7 - (2,3-epoxypropyl) -8 - chloro-theophylline was prepared substantially as described in Example I, employing 0.2 molar quantities of epichlorohydrin and 8-chloro-theophylline and refluxing for 7 hours. The product melted at 215–20° C.

EXAMPLE IV 7-cyclohexyl-8-chloro-theophylline was prepared substantially as described in Example I, employing 0.25 molar quantities of cyclohexyl chloride and 8-chloro-theophylline and refluxing for 24 hours.

EXAMPLE V 7-benzyl-8-chloro-theophylline was prepared substantially as described in Example I, employing 0.2 molar quantities of benzyl chloride and 8-chloro-theophylline and refluxing for 5 hours. The product melted at 149–50° C.

EXAMPLE VI 7-p-methylbenzyl-8-chloro-theophylline was prepared substantially as described in Example I, employing 0.125 molar quantities of p-methylbenzyl bromide and 8-chloro-theophylline and refluxing for 4 hours. The product melted at 163–5° C.

EXAMPLE VII 7-m-methylbenzyl-8-chloro-theophylline was prepared substantially as described in Example I, employing 0.125 molar quantities of m-methylbenzyl bromide and 8-chloro-theophylline and refluxing for 4 hours. The product melted at 123–5° C.

EXAMPLE VIII 7-o-methylbenzyl-8-chloro-theophylline was prepared substantially as described in Example I, employing 0.1 molar quantities of o-methylbenzyl bromide and 8-chlorotheophylline and refluxing for 2½ hours. The product melted at 158–60° C.

EXAMPLE IX 7-p-nitrobenzyl-8-chloro-theophylline was prepared substantially as described in Example I, employing 0.1 molar quantities of p-nitrobenzyl bromide and 8-chloro-theophylline and refluxing for 3 hours. The product melted at 215–17° C.

EXAMPLE X 8-chloro-theophylline and m-nitrobenzyl chloride in 0.056 molar quantities were heated with 0.038 N KOH solution in 50% aqueous ethanol at 125° C. in a closed shaker reaction vessel for 24 hours. The cooled reaction mixture was extracted several times with chloroform which was then evaporated. The product was digested with isopropanol, filtered, dried and recrystallized. The 7-m-nitrobenzyl-8-chloro-theophylline melted at 183–7° C.

EXAMPLE XI 7-(3,4-dichlorobenzyl)-8-chloro-theophylline was prepared substantially as described in Example I, employing 0.2 molar quantities of 3,4-dichlorobenzylchloride and 8-chlorotheophylline and refluxing for 3½ hours.

EXAMPLE XII 7-(2,4-dichlorobenzyl)-8-chloro-theophylline was prepared substantially as described in Example X, employing 0.056 molar quantities of 2,4-dichlorobenzyl chloride and heating for 24 hours. The compound melted at 207–10° C.

EXAMPLE XIII

7-α-methylbenzyl-8-chloro-theophylline was prepared substantially as described in Example I, employing 0.125 molar quantities of α-methylbenzyl bromide and 8-chloro-theophylline and refluxing for 3 hours.

EXAMPLE XIV

7-β-phenylethyl-8-chloro-theophylline was prepared substantially as described in Example I, employing 0.1 molar quantities of β-phenylethyl bromide and 8-chloro-theophylline and refluxing for 2 hours. The product melted at 148–51° C.

EXAMPLE XV

7-β-cyclohexylethyl-8-chloro-theophylline was prepared substantially as described in Example I, employing 0.25 molar quantities of β-cyclohexylethyl bromide and 8-chloro-theophylline and refluxing for 3 hours.

EXAMPLE XVI 7-phenacyl-8-chloro-theophylline was prepared substantially as described in Example I, employing 0.25 molar quantities of phenacyl bromide and 8-chloro-theophylline and refluxing for 4 hours. The compound melted at 245–7° C.

EXAMPLE XVII 7-p-nitrophenacyl-8-chloro-theophylline was prepared substantially as described in Example X, using 0.056 molar quantities of p-nitrophenacyl bromide and 8-chloro-theophylline and heating for 24 hours. The product melted at 203–5° C.

EXAMPLE XVIII

7-γ-phenyl-propyl-8-chloro-theophylline was prepared substantially as described in Example I, employing 0.2 molar quantities of γ-phenyl-propyl chloride and 8-chloro-theophylline and refluxing for 5 hours.

EXAMPLE XIX

7-β-phenoxyethyl-8-chloro-theophylline was prepared substantially as described in Example I, employing 0.25 molar quantities of β-phenoxyethyl chloride and 8-chloro-theophylline and refluxing for 24 hours.

EXAMPLE XX 7-propargyl-8-bromo-theophylline was prepared substantially as described in Example I, employing 13 grams (0.05 mol.) of 8-bromo-theophylline, 7.2 grams (0.06 mol.) of propargyl bromide and 50 ml. 1 N NaOH. The product melted at 189–91° C.

EXAMPLE XXI 7-benzyl-8-bromo-theophylline was prepared substantially as described in Example I, employing 13 grams (0.05 mol) of 8-bromo-theophylline, 7.6 grams (0.06 mol.) of benzyl chloride and 5 ml. 1 N NaOH. The product melted at 165–7° C.

EXAMPLE XXII

A mixture of 12.7 grams of 7-allyl-8-chloro-theophylline and 11.6 grams of β-diethylaminoethylamine in water was refluxed for 17 hours. The reaction mixture was acidified with 2 N HCl, filtered, and made alkaline with 2 N NaOH. The precipitated product was separated, purified and dried. 10.3 grams of 7-allyl-8-β-diethylaminoethylamino-theophylline were obtained. The compound is a white crystalline solid having a melting point of 108–10° C.

The free base compound was dissolved in ethanol and treated with ethereal hydrogen chloride. The resulting salt, 7-allyl-8-β-diethylaminoethylamino-theophylline hydrochloride was filtered, washed and dried. The salt is a white crystalline solid having a melting point of 228–232° C.

EXAMPLE XXIII

7 - propargyl - 8 - β - diethylaminoethylamino - theophylline was prepared according to the method described in Example XXII, employing 8.4 grams of 7-propargyl-8-chloro-theophylline and 7.8 grams of β-diethylaminoethylamine. Refluxing time was 17 hours. The compound is a white, crystalline solid having a melting point of 129–31° C.

7 - propargyl - 8 - β - diethylaminoethylamino - theophylline hydrochloride was prepared by treating an ether solution of the free base with ethereal HCl. The salt is a crystalline solid having a melting point of 245° C.

EXAMPLE XXIV

7 - benzyl - 8 - γ - dimethylaminopropylamino - theophylline was prepared according to the method described in Example XXII, employing 15.3 grams of 7-benzyl-8-chloro-theophylline and 10.2 grams of γ-dimethylaminopropylamine. Refluxing time was 21 hours. The free base compound is an oil at ordinary temperatures.

7 - benzyl - 8 - γ - dimethylaminopropylamino - theophylline dihydrochloride was prepared by treating an isopropanol solution of the free base with ethereal HCl. The salt is a crystalline solid having a melting point of 200–205° C.

EXAMPLE XXV

7 - benzyl - 8 - β - diethylaminoethylamino - theophylline was prepared according to the method described in Example XXII, using 15.3 grams of 7-benzyl-8-chloro-theophylline and 11.6 grams of β-diethylaminoethylamine. Refluxing time was 12 hours. The free base compound is an oil at ordinary temperatures.

7 - benzyl - 8 - β - diethylaminoethylamino - theophylline hydrochloride was prepared by treating an ethanol solution of the free base with ethereal HCl. The salt is a crystalline solid melting at 208–9° C.

EXAMPLE XXVI

7 - p - nitrobenzyl - 8 - β - diethylaminoethylamino-theophylline was prepared according to the method described in Example XXII, employing 17.5 grams of 7-p-nitrobenzyl-8-chloro-theophylline and 11.6 grams of β-diethylaminoethylamine. Refluxing time was 17 hours. The free base compound is an oil at ordinary temperatures.

7 - p - nitrobenzyl - 8 - β - diethylaminoethylamino - theophylline hydrochloride was prepared by treating a benzene solution of the free base with ethereal HCl. The salt is a crystaline solid melting at 195° C.

EXAMPLE XXVII

7 - o - methylbenzyl - 8 - β - diethylaminoethylamino-theophylline was prepared according to the method described in Example XXII, employing 6.6 grams of 7-o-methylbenzyl-8-chloro-theophylline and 4.6 grams of β-diethylaminoethylamine. Refluxing time was 10 hours. Yield was 5.5 grams. The compound is a white crystalline solid having a melting point of 102–3° C.

7 - o - methylbenzyl-8-β-diethylaminoethylamino-theophylline hydrochloride was prepared by treating an isopropanol solution of the free base with ethereal HCl. The salt is a crystalline solid melting at 230–3° C.

EXAMPLE XXVIII 7-(3,4-dichlorobenzyl)-8 - β - diethylaminoethylamino-theophylline was prepared according to the method described in Example XXII, employing 11.2 grams of 7-(3,4-dichlorobenzyl)-8-chloro-theophylline and 7.0 grams of β-diethylaminoethylamine. Refluxing time was 8 hours. Yield was 7.5 grams. The compound is a solid melting at 145–50° C.

7-(3,4-dichlorobenzyl)-8-β - diethylaminoethylamino-theophylline hydrochloride was prepared by treating an isopropanol solution of the free base with ethereal HCl. The salt is a crystalline solid melting at 195–205° C.

EXAMPLE XXIX 7-phenacyl-8-β-diethylaminoethylamino - theophylline was prepared according to the method described in Example XXII, employing 16.6 grams of 7-phenacyl-8-chloro-theophylline and 11.6 grams of β-diethylaminoethylamine. Refluxing time was 5 hours. Yield was 11.5 grams. The compound is a solid melting at 146–9° C.

7-phenacyl-8-β-diethylaminoethylamino - theophylline hydrochloride was prepared by treating an isopropanol solution of the free base with ethereal HCl. The salt is a crystalline solid melting at 265° C.

EXAMPLE XXX

7-β-phenylethyl-8-β-diethylaminoethylamino - theophylline was prepared according to the method described in Example XXII, employing 15.9 grams of 7-β-phenylethyl-8-chloro-theophylline and 11.6 grams β-diethylaminoethylamine. Refluxing time was 19 hours. The compound is a solid melting at 132–3° C.

7-β-phenylethyl-8-β-diethylaminoethylamino - theophylline hydrochloride was prepared by treating an ethanol solution of the free base with ethereal HCl. The salt is a crystalline solid melting at 225–8° C.

EXAMPLE XXXI 7-propargyl-8-β-diethylaminoethylamino - theophylline fumarate was prepared by adding fumaric acid to an ethanol solution of the free base parent compound. The fumarate salt is a white crystalline solid having a melting point of 191–3° C.

EXAMPLE XXXII

8-β-diethylaminoethylamino-7-propargly - theophylline and propargly bromide in ethanol solution were heated under reflux for several hours. The quaternary ammonium product, 8-(β - diethylproparglyamino)-ethylamino-7-propargyl-theophylline bromide melts at 201–204° C. with decomposition.

EXAMPLE XXXIII

The quaternary ammonium derivative 8-(β-diethylbenzyl-amino)-ethylamino-7-propargyl-theophylline chloride was prepared as described in Example XXXII from 8-β-diethylaminoethylamino-7-propargyl-theophylline and benzyl chloride. The compound melts at 152–3° C. with decomposition.

EXAMPLE XXXIV

The quaternary ammonium derivative 8-β-(diethylmethylamino)-ethylamino-7-propargly-theophylline bromide was prepared by treating an ethanol solution of 8-β - diethylaminoethylamino-7-propargyl-theophylline with methyl bromide in a closed system at 80° C. for several hours. The compound has a melting point of 223–5° C.

EXAMPLE XXXV 7-cyclohexyl-8-β-diethylaminoethylamino - theophylline was prepared substantially as described in Example XXII by refluxing 14.8 grams 7-cyclohexyl-8-chloro-theophylline with 11.6 grams β-diethylaminoethylamine in ethanol solution in a closed system for about 8 hours at a temperature of about 100° C.

EXAMPLE XXXVI 8-(β - diethylaminoethylamino)-7-(2,3 - epoxypropyl)-theophylline hydrochloride was prepared as follows. 13.5 grams of 7-(2,3-epoxypropyl)-8-chlorotheophylline, 11.6 grams of β-diethylaminoethylamino and 300 ml. of water were heated at reflux for 20 hours. At the end of this time, an oil was precipitated by saturating the cooled solution with NaCl and warming. The supernatant was decanted and the oil dissolved in isopropanol. This solution was dried azeotropically by boiling out benzene. Addition of ethereal hydrogen chloride caused a hydroscopic solid to separate, which after recrystallization from isopropanol yielded 3.5 grams of a white crystalline solid melting at 265–75° C. with decomposition.

EXAMPLE XXXVII

The quaternary ammonium derivative 7-allyl-8(β-diethylaminoethylamino)-theophylline allyl bromide, was prepared as follows. Two grams of 7-allyl-8(β-diethylaminoethylamino)-theophylline (0.006 mole) were dissolved in anhydrous isopropanol. 1 gram of allyl bromide (0.066 mole) was added and the mixture heated at reflux 6 hours. The product was precipitated by adding anhydrous ether. The resulting white solid was filtered and dried; wgt., 1.4 gm., M.P. 195–200° C.

The 8-dialkylaminoalkylamino compounds of our invention are therapeutically active, for example, as antihistamines, as diuretics, and in reducing arterial blood pressure.

EXAMPLE XXXVIII

To determine antihistaminic activity, rats or guinea pigs were treated with the drug intravenously or intraperitoneally, and then challenged with histamine diphosphate intravenously at 0.4 mg./kg. Active compounds prevent the normal blood pressure lowering response to histamine and death.

| Compound | Minimum effective dose, mg./kg. | Route |
| --- | --- | --- |
| 7-Benzyl-8-β-diethyl aminoethylamino-theophylline, HCl. | 15 | I.V. |
| 7-o-Methylbenzyl-8-β-diethylaminoethyl-amino-theophylline, HCl. | 5 | I.V. |
| Theophylline (as aminophylline) | Inactive up to 100 mg./kg. | I.V. |
| Benadryl | 10 | I.V. |

EXAMPLE XXXIX 7-benzyl-8-β-diethylaminoethylamino-theophylline HCl possesses marked blood pressure lowering activity as indicated by the following test data:

(A) At a dose of 5. mg./kg., intravenously, in 6 dogs, the compound caused an average decrease of 50% in blood pressure, from 120 to 60 mm. Hg.

(B) Arterial blood pressure in unanesthetized trained rats was measured by observing the pressure at which there was an increase in volume of the tail as the pressure in a restricting cuff was lowered. At a does of 15 mg./kg., intraperitoneally, twice a day for thirty days, an average decrease was observed of 30% below normal, from about 100 to 70 mm. Hg.

EXAMPLE XL

7 - allyl - 8 - β - diethylaminoethylamino-theophylline possesses marked blood pressure lowering activity as indicated by the following test data.

The carotid artery of a 2.25 kg. cat was cannulated and connected to an ink writing mercury manometer. The compound, at 5 mg./kg., was injected via the saphenous vein. Blood pressure was reduced from 120 to 60, returned to 100 within 4 minutes, and remained at this level for 1 hour.

EXAMPLE XLI

7 - allyl - 8 - β - diethylaminoethylamino-theophylline possesses marked diuretic activity and is comparable in this respect to aminophylline.

Rats weighing 200–300 grams were fasted for 18–24 hours and given physiological saline (0.9%) at a dose of 15 cc./kg. body weight. The drugs were dissolved in the saline and given at the doses shown in the table. The amount of urine produced in five hours was measured. Aminophylline was used as a standard. Saline controls (no drugs) were also run.

From the table it is seen that with no drug, about 55% of the water given as saline was returned as urine. Percent return indicates the amount of urine expressed as a percentage of the normal saline administered to the rats. The collection period was five hours. With aminophylline, the percent return was about 80 at 40 mg./kg. and 125 at 80 mg./kg. The 7-allyl compound was comparable in activity to aminophylline.

| Aminophylline, percent return, mg./kg. | | 7-Allyl-8-DEAEA Theophylline, percent return, mg./kg. | | Saline, percent return |
| --- | --- | --- | --- | --- |
| 125 | 80 | 147 | 40 | 57 |
| 81 | 40 | 88 | 40 | 53 |

Toxicity of the compounds is relatively low as shown by the acute $LD_{50}$ data given in the following table:

Table 1

| Compound | $LD_{50}$, mg./kg. | Animal | Route |
| --- | --- | --- | --- |
| 7-Allyl-8-β-diethylaminoethylamino-theophylline, HCl. | 30 | rats | I.V. |
| 7-Propargyl-8-β-diethylaminoethyl-theophylline, HCl. | 100 | rats | I.V. |
| 7 - Benzyl - 8 - β - diethylaminoethyl-amino-theophylline, HCl. | 35 | rats | I.V. |
| Do | 100 | mice | I.P. |
| 7-o-Methylbenzyl-8-β-diethylamino-ethylamino-theophylline, HCl. | 50 | rats | I.V. |
| Do | 30 | guinea pigs | I.V. |
| 7-Phenacyl-8-β-diethylaminoethyl-amino-theophylline, HCl. | 100 | rats | I.V. |

EXAMPLE XLII

Rats given 20 mg./kg. daily, intraperitoneally of 7-benzyl - 8 - β - diethylaminoethylamino-theophylline for one year showed no adverse effects upon appetite, growth, reproduction and appearance. No abnormalities were found upon autopsy of sacrificed animals.

The 8-dialkylaminoalkylamino compounds can be administered in any desired manner. Where an aqueous vehicle is to be used, it is, of course, desirable to employ the more water-soluble derivatives, namely the acid salts or quaternary ammonium derivatives. The compounds can also be carried in solution in an organic solvent, such as ethanol, or in admixture with a suitable non-toxic, solid vehicle, such as starch, milk sugar, bentonite and the like.

Although this invention has been described with reference to illustrative embodiments thereof, it will be apparent to those skilled in the art that the principles of this invention may be embodied in other forms but within the scope of the claims.

We claim:

1. Compounds selected from the group consisting of the compounds having the structural formula:

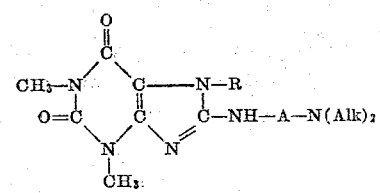

wherein A is lower alkylene; Alk is lower alkyl; and R is selected from the group consisting of lower-alkenyl, lower-alkinyl, epoxy-(lower-alkyl), phenyl-(lower-alkyl), halophenyl-(lower-alkyl), (lower-alkyl)-phenyl-(lower-alkyl), nitrophenyl-(lower-alkyl), cyclohexyl, and benzoyl-(lower-alkyl); their acid salts; and their quaternary ammonium salts selected from the group consisting of lower-alkyl, lower-alkenyl, lower-alkinyl, and phenyl-(lower-alkyl) quaternary ammonium salts.

2. Compounds having the structural formula:

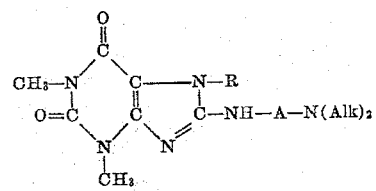

wherein A is lower-alkylene; Alk is lower-alkyl; and R is phenyl-(lower-alkyl).

3. The acid salts of the compounds of claim 2.
4. Compounds having the structural formula:

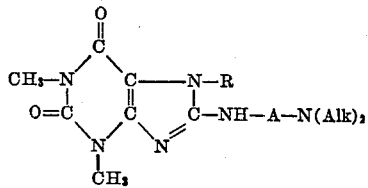

wherein A is lower-alkylene; Alk is lower alkyl; and R is (lower-alkyl)-phenyl-(lower-alkyl).

5. The acid salts of the compounds of claim 4.
6. The acid salts of 7-benzyl-8-β-diethylaminoethyl-amino-theophylline.
7. The HCl salts of 7-benzyl-8-β-diethylaminoethyl-amino-theophylline.
8. The acid salts of 7-o-methylbenzyl-8-β-diethylamino-ethylamino-theophylline.
9. The HCl salt of 7-o-methylbenzyl-8-β-diethylamino-ethylamino-theophylline.
10. Compounds having the structural formula:

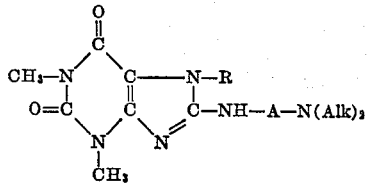

wherein A is lower-alkylene; Alk is lower-alkyl; and R is lower-alkenyl.

11. 7 - allyl - 8 - β - diethylaminoethylamino-theophylline.
12. The HCl salt of 7 - allyl - 8 - β - diethylaminoethyl-amino-theophylline.
13. Compounds having the structural formula:

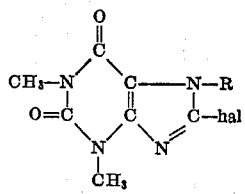

wherein hal is halogen selected from the group consisting of chlorine, bromine and iodine; and R is selected from the group consisting of lower-alkenyl, lower-alkinyl, epoxy-(lower-alkyl), phenyl-(lower-alkyl), halophenyl-(lower-alkyl), (lower-alkyl)-phenyl-(lower-alkyl), nitrophenyl-(lower-alkyl), cyclohexyl, and benzoyl-(lower-alkyl).

14. The compounds of claim 13 in which hal is chlorine and R is phenyl-lower alkyl.
15. The compounds of claim 13 in which R is phenyl-(lower-alkyl).
16. The compounds of claim 13 in which R is (lower-alkyl)-phenyl (lower-alkyl).
17. The compounds of claim 13 in which R is lower-alkenyl.
18. 7-benzyl-8-chloro-theophylline.
19. 7-o-methylbenzyl-8-chloro-theophylline.
20. 7-allyl-8-chloro-theophylline.

No references cited.